Aug. 30, 1932.  H. V. BIRD  1,875,303
COOKING UTENSIL AND THE LIKE
Filed Jan. 6, 1932  3 Sheets-Sheet 1

Inventor,
Hugh V. Bird,
By Sommers & Young
Attys.

Aug. 30, 1932.    H. V. BIRD    1,875,303
COOKING UTENSIL AND THE LIKE
Filed Jan. 6, 1932    3 Sheets-Sheet 2

Inventor
Hugh V. Bird,
By Sommers & Young
attys.

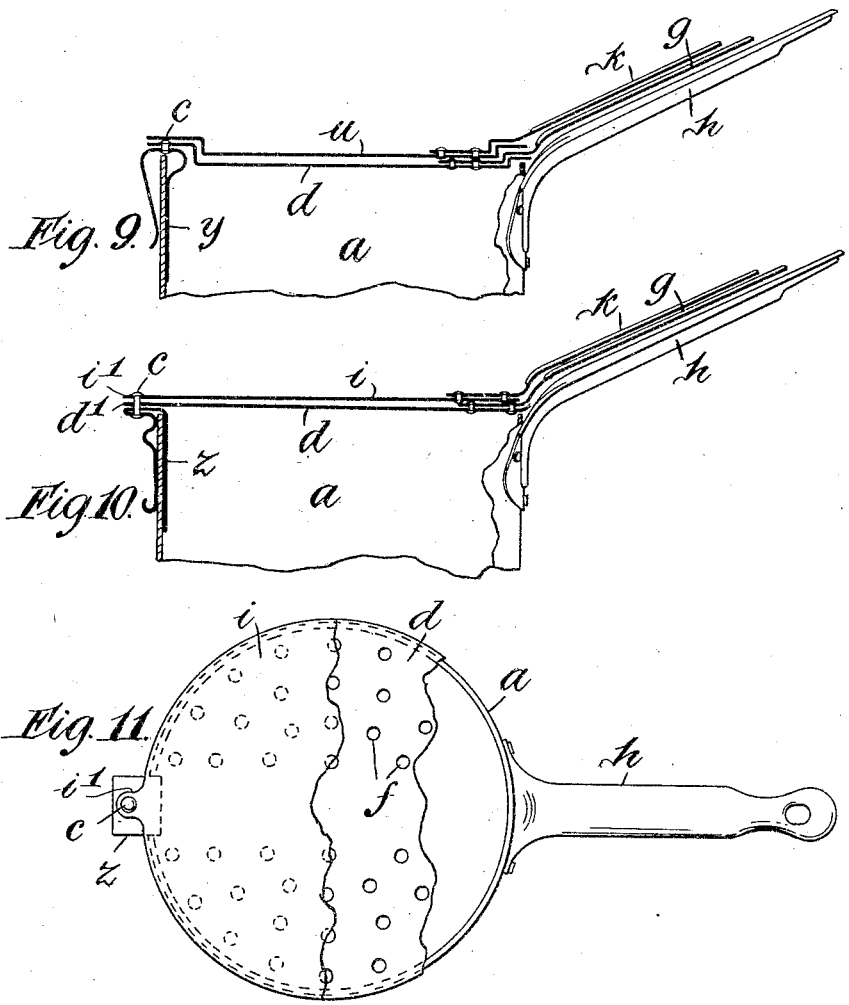

Patented Aug. 30, 1932

1,875,303

UNITED STATES PATENT OFFICE

HUGH VELLICOTT BIRD, OF NEATH, SOUTH WALES

COOKING UTENSIL AND THE LIKE

Application filed January 6, 1932, Serial No. 585,086, and in Great Britain October 23, 1930.

This invention relates to improvements in straining devices and lids adapted to be detachably secured to cooking utensils and such other utensils as are or may be provided with a lid and means for straining the contents, thus enabling the operator to pour off some or all of the liquid while retaining the rest of the contents of the vessel in the latter without having to remove the lid from the utensil or vessel, that is to say, it has already been proposed to provide the lids of cooking vessels with perforations and to mount on such lids, on vertical pivots or on horizontal hinges, appropriate valvular devices for opening and closing such perforations in order to permit of the exit of steam from the vessel or to retain steam within the said vessel or to allow of straining the contents of the vessel. Moreover, in some cases such lids and in other cases independent strainers mounted on horizontal hinges have been detachably secured to the vessels by spring clips, brackets or by bayonet joint devices.

According to this invention, a strainer or a strainer and a lid for a cooking utensil or other vessel is or are mounted on a vertical pivot which is provided with means, such as a spring clip for instance, for detachably securing it at any desired position to the utensil or vessel. Thus, both the lid and the strainer may be hinged on the pivot pin or only the strainer may be so mounted and the lid is then adapted to fit loosely in, on or over the strainer.

And in order that the invention may be readily understood and carried into effect, reference will be made to the accompanying drawings of which:—

Figures 8 and 9 are similar views of other modifications.

Figure 10 is a sectional elevation of yet another modification and

Figure 11 is a plan thereof with parts of the strainer and lid broken away.

Figure 1:
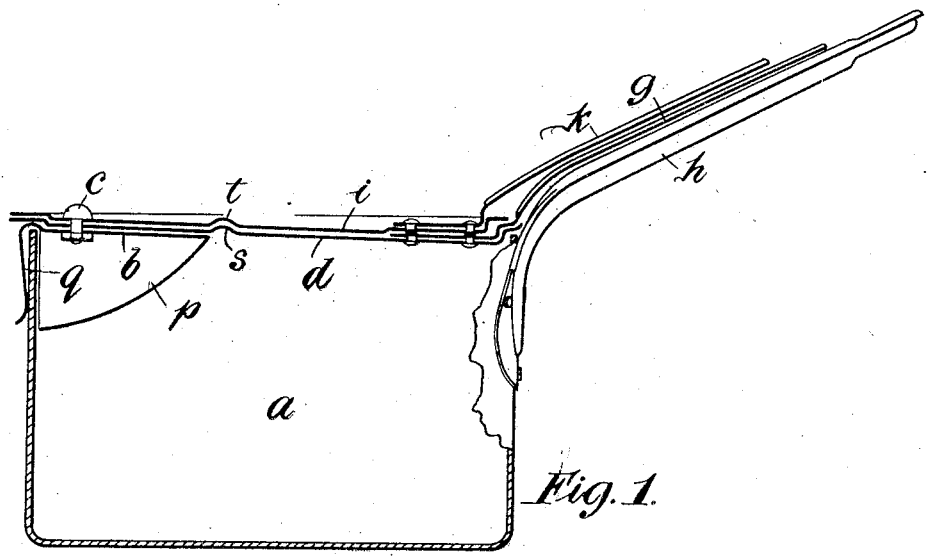
Figure 1 is a sectional elevation of a saucepan provided with a strainer and a lid made in accordance with this invention and secured to the utensil by a spring clip.
Figure 2:
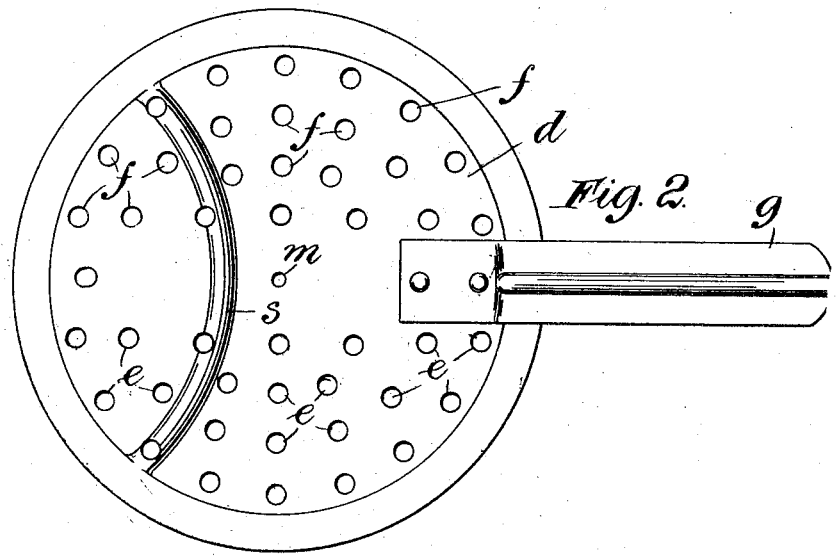
Figure 2 is a plan view of the strainer.
Figure 3:
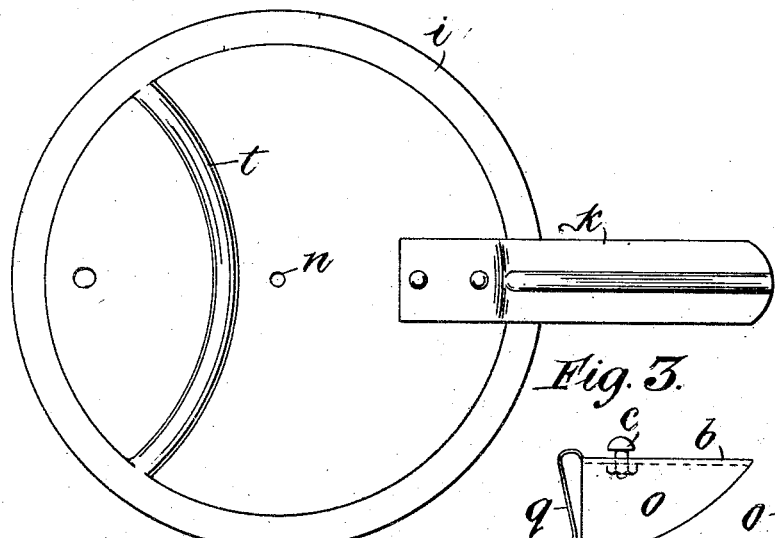
Figure 3 is a plan view of the lid.
Figures 4, 6:
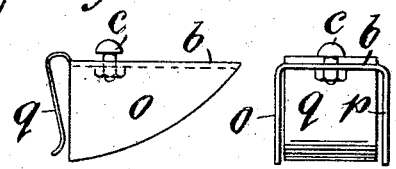
Figure 4 is a side elevation of a clip.
Figure 6 is an end view.
Figure 5:
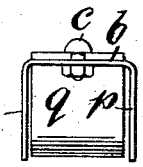
Figure 5 is an inverted plan view thereof.

In carrying the invention into effect and according to the construction shown in Figures 1 to 6, inclusive, a vessel, such as a saucepan $a$ (Figure 1) is provided with a clip $b$ which is detachably connected to the side of the vessel and is provided with a pin or pivot, such as a bolt $c$ as shown, or any other suitable device, such as a screw, stud or rivet, may be employed. On this bolt $c$ is pivotally mounted a strainer $d$ which, as shown, may be a disc $d$, a segment of which is provided with a number of holes $e$, or, if desired, it may also have additional perforations such as are indicated by the circles $f$ so that the perforations extend over, practically, the whole of the strainer. Opposite to the pivot $c$, and as best seen in Figure 2, there may be a handle $g$ which follows more or less the contour and angle of the handle $h$ of the vessel. The handle $g$ may be made much shorter, if preferred. This disc may be flat or, as shown, it may be slightly dished so as to fit, more or less, on to or into the interior of the vessel. Or, instead of making the strainer in the form of a disc, it may be made, more or less, in the form of a perforated crescent or segment to fit in or on the saucepan and furnished, if desired, with a handle. The clip $b$ as shown in Figures 1, 4, 5 and 6 is so constructed that the pivot $c$ is just inside the periphery of the vessel $a$. The lid, proper, marked $i$, also provided with a similar handle marked $k$, is mounted on the bolt or pivot $c$ and is dished, as shown, or it may be flat. If desired, both strainer and lid may have a small hole or holes in alignment, marked $m$ and $n$, respectively, so as, when they are in the position shown in Figure 1, on the vessel, to allow of the escape of air or steam but generally, these holes are unnecessary. The clip itself may be of any suitable construction and comprises in this example, the body part $b$ carrying the pivot pin or bolt $c$, two opposite and downwardly projecting lips or flanges o and p (Figures 1, 4, 5 and 6) each adapted to rest with one edge against the inside of the vessel and a downwardly projecting tongue or lip q adapted to rest against and grip the outside of the vessel. Or there may be more than one such tongue or lip q. The body part b is provided with a hole to receive the pivot or bolt c which is furnished with a nut r. Owing to the fact that both strainer d and lid i are dished, it is preferable to make the hole for the pivot oval in each of these for permitting a certain amount of sliding movement of the lid and strainer, one on the other, when being moved relatively on the pivot. If desired, a stop or stops is or are provided such as a semicircular stamped rib s, formed on the strainer d and a similar rib t forming a groove on the under side of the lid i. When the groove and rib engage as is normally the case, they tend to keep the lid and strainer in the required position. If the lid be moved in relation to the strainer, the groove formed by the rib t in the lid comes out of engagement with the rib s on the strainer. In this condition and when desiring to strain the contents of the saucepan the lid is turned at an angle of, say, 45° to 90° so that the lid handle k is some distance away from the handles g and h and part of the rib s on the strainer is pressing against the plane under-surface of the lid with a certain amount of pressure and the lid stays in position without being held by hand. The two handles g and h are then gripped in the operator's hand, the vessel is tilted and the straining away of the liquid follows:—

Figure 7:
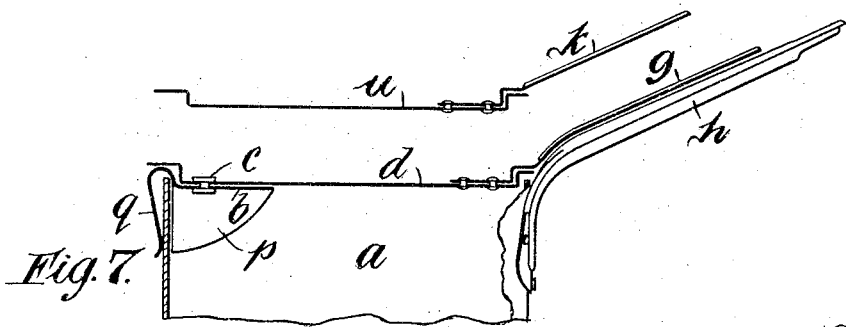
Figure 7 is a sectional elevation of a modification.

On referring to Figure 7, it will be seen that only the strainer d is pivoted to the clip b and the lid u (shown slightly raised above the strainer) is adapted to fit loosely into the top of the strainer.

Figure 8:
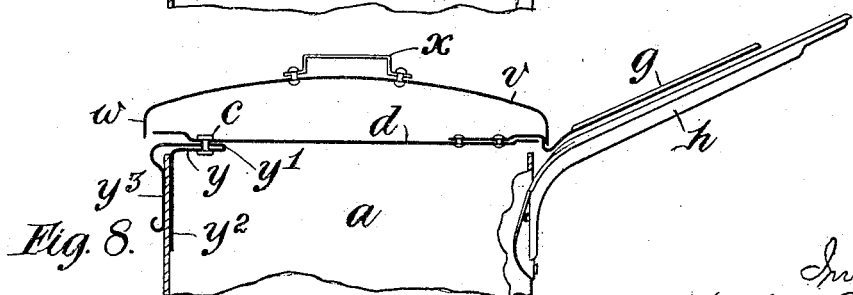

Or, as shown in the detail view Figure 8, the lid v may be of larger diameter and furnished with a flange w to fit loosely on the strainer or on the vessel and in this case the lid v is shown provided with a fixed bail-handle x. The clip y consists of a strip of elastic metal bent at right angles at y' and the leg y² is bent downwards to engage the inner surface of the vessel whilst the other bent leg y³ engages the outside of the vessel.

The construction shown in Figure 9 shows the pivot c mounted on the top of the clip y in line with the upper edge of the vessel, the strainer d is mounted on the pivot and the lid u is loose.

Finally, as shown in Figures 10 and 11, the clip z is so shaped that the pivot c is outside the upper edge of the vessel and, consequently, the strainer is provided with a perforated lug d' and the lid i is similarly provided at i'.

The clip may be modified in various ways as for instance by providing the same with spring tongues to engage both the inside and outside of the vessel; or a spring tongue or spring tongues may be provided to press upon the inside of the vessel and the clip formed with a rigid flange or lip to bear upon the outside of the vessel. Or instead of providing the spring tongue q, Figures 1 and 4 this may be formed as a rigid member to receive a clamping screw, cam or the like which is adapted to press upon the outside of the vessel and clamp the latter between the said screw or cam and the clip flanges o and p which bear upon the inside of the vessel. Obviously the shapes of the strainer and lids may be modified as desired.

I claim:—

1. A strainer and lid for a cooking utensil comprising a strainer adapted to cover the utensil a lid above said strainer, a clip adapted to engage the utensil and a vertical pivot pin connecting the said strainer and lid near their edges to said clip to enable the lid and strainer to be turned independently or together on said pin.

2. A strainer and lid for a cooking utensil, comprising a perforated plate adapted to cover said utensil, a lid adapted to cover said plate, a clip, for attaching said plate and lid to said utensil and a vertical pivot pin rotatably connecting said lid and plate to said clip.

3. A strainer and lid for a cooking utensil, comprising a strainer adapted to cover the utensil a lid above said strainer, a clip adapted to be removably connected to the utensil, and a vertical pivot in said clip for rotatably connecting said lid and strainer near their edges and to said clip.

4. A strainer and lid for a cooking utensil, comprising a strainer adapted to cover said utensil a lid adapted to cover said strainer, a spring clip adapted to be detachably applied to said utensil and a vertical pivot pin on said clip engaging the strainer and lid near their edges for rotatably supporting the strainer and the lid independently on said clip.

5. An attachment for cooking utensils having upstanding side walls comprising, a perforated strainer, adapted to cover the utensil, an imperforate lid above said strainer, said strainer and lid being independently pivotally connected near their edges with a common pivot, said pivot having means for detachably securing it to the upstanding wall of the utensil.

HUGH VELLICOTT BIRD.